Patented Feb. 26, 1929.

1,703,145

UNITED STATES PATENT OFFICE.

ERWIN HOFFA, OF HOCHST-ON-THE-MAIN, AND JENS MÜLLER, OF HANAU-ON-THE-MAIN, AND FRITZ MÜLLER, OF HOCHST-ON-THE-MAIN, GERMANY, ASSIGNORS TO GRASSELLI DYESTUFF CORPORATION, OF NEW YORK, N. Y., A CORPORATION OF DELAWARE.

PROCESS OF MAKING 1-METHYL-5-CHLOROBENZENE-2-CARBOXAMINO-3-THIOGLYCOLLIC ACID.

No Drawing. Application filed August 9, 1927, Serial No. 211,850, and in Germany April 16, 1927.

We have found, that 1-methyl-5-chloro-2-cyanobenzene-3-thioglycollic acid of the formula:

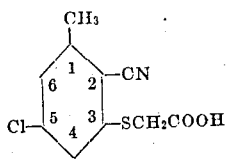

however prepared, when treated in a suitable manner with acid saponifying agents is converted into a new compound which, according to our investigations, has the chemical constitution of a carboxyamino-thioglycollic acid of the formula:

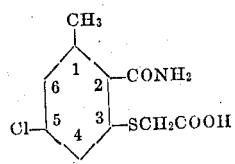

The reaction probably is effected according to the following equation:

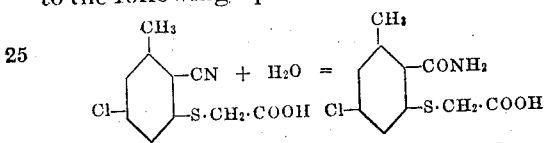

This is surprising fact, as Friedländer (see Liebigs Annalen, vol. 351, page 415) states that the cyanobenzene-o-thioglycollic acid of the formula:

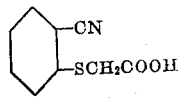

is stable to the action of acids, and remains unattacked even when boiled with concentrated hydrochloric acid. Our new process runs quite smoothly and produces the new compound in a very good yield, and in a pure state. The new compound is, when dry, a white crystalline powder, easily soluble in organic solvents, soluble in hot water, crystallizing from dilute alcohol in almost colorless needles, melting at 173–174°. By the action of alkaline agents at an elevated temperature it is transformed into the 6-chloro-4-methyl-3-hydroxythionaphthene-2-carboxylic acid and the 6-chloro-4-methyl-3-hydroxythionaphthene respectively, which process is the subject matter of our copending application No. 211,852 filed Aug. 9, 1927. It may be used, therefore, as a new parent material for the production of 6.6'dichloro-4.4'-dimethyl-thioindigo.

The following examples will further illustrate our invention, the parts being by weight and all temperatures in centigrade degrees; it is understood that our invention is not limited to the particular proportions, reaction conditions or materials listed therein.

1. 10 parts of 1-methyl-5-chloro-2-cyanobenzene-3-thioglycollic acid, obtainable for instance according to the process described in British Patent No. 18,292/1914, are introduced into about 180 parts of hot sulfuric acid of 90% strength and the solution is kept for about an hour at the temperature of about 90°. After cooling down, the reaction mixture is poured into water and the mixture is allowed to stand for some hours. The separated product of reaction is almost entirely pure, melting at 171–172°. It may be recrystallized from dilute alcohol, yielding then almost colorless needles melting at 173–174°. It is easily soluble in organic solvents, soluble in hot water. The yield obtained is almost theoretical.

2. 10 parts of 1-methyl-5-chloro-2-cyanobenzene-1-thioglycollic acid are dissolved in about 200 parts of concentrated sulfuric acid of 66° Bé. and the solution is allowed to stand at room temperature for some days. Then it is poured into water and the isolation of the separated product of reaction is carried out as described above. It is identical with the product of Example 1.

In some cases it is advantageous to add boric acid to the sulfuric acid solution.

We claim:

1. Process which comprises subjecting 1-methyl-5-chloro-2-cyanobenzene-3-thioglycollic acid of the formula

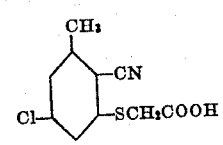

to treatment with sulfuric acid until the corresponding 2-carboxyamino compound is formed, and stopping the reaction before further conversion of the said 2-carboxyamino compound by dilution of the reaction mixture.

2. Process for the manufacture of 1-methyl-5-chloro-benzene-2-carboxyamino-3-thioglycollic acid of the formula

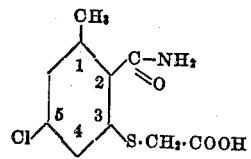

which comprises subjecting one part by weight of 1-methyl-5-chloro-2-cyanobenzene-3-thioglycollic acid to a limited treatment with about 18 parts by weight of sulfuric acid of about 90% strength for about an hour at a temperature of about 90° C., and diluting the resulting reaction mixture with water.

In testimony whereof, we affix our signatures.

ERWIN HOFFA.
JENS MÜLLER.
FRITZ MÜLLER.